July 12, 1966  G. B. SUNDBY  3,260,536
PUSHER MECHANISM FOR VEHICLES
Filed Oct. 1, 1963  3 Sheets-Sheet 1
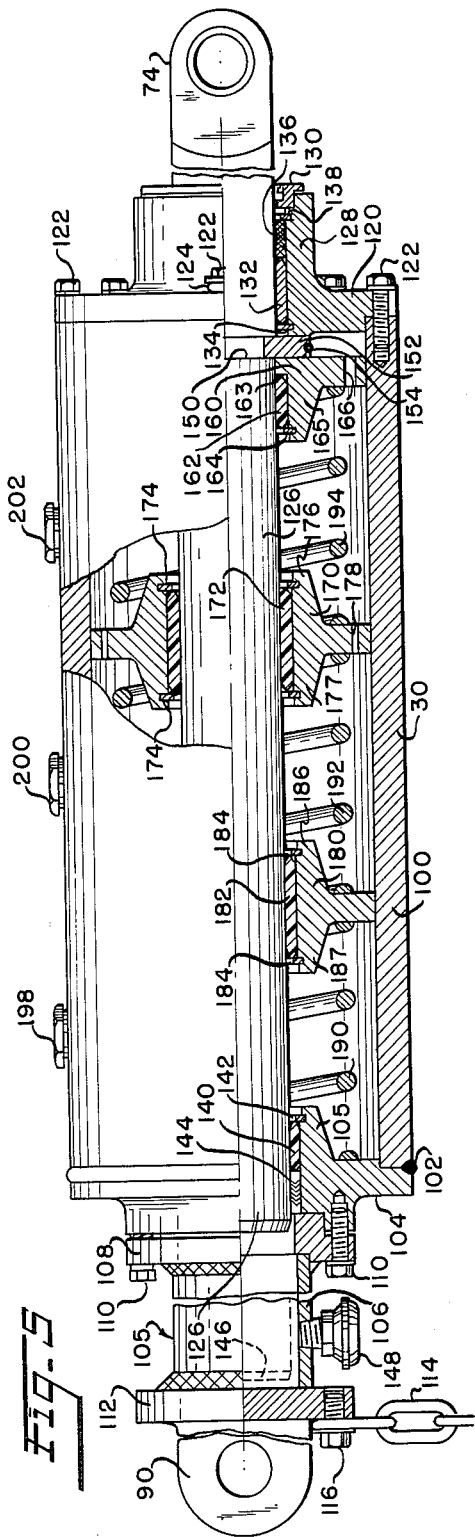
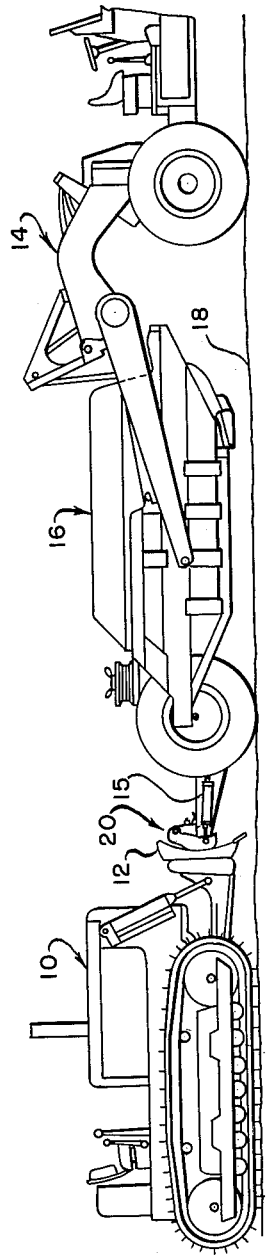
INVENTOR
Gustav B. Sundby
BY *Strauch, Nolan & Neale*
ATTORNEYS

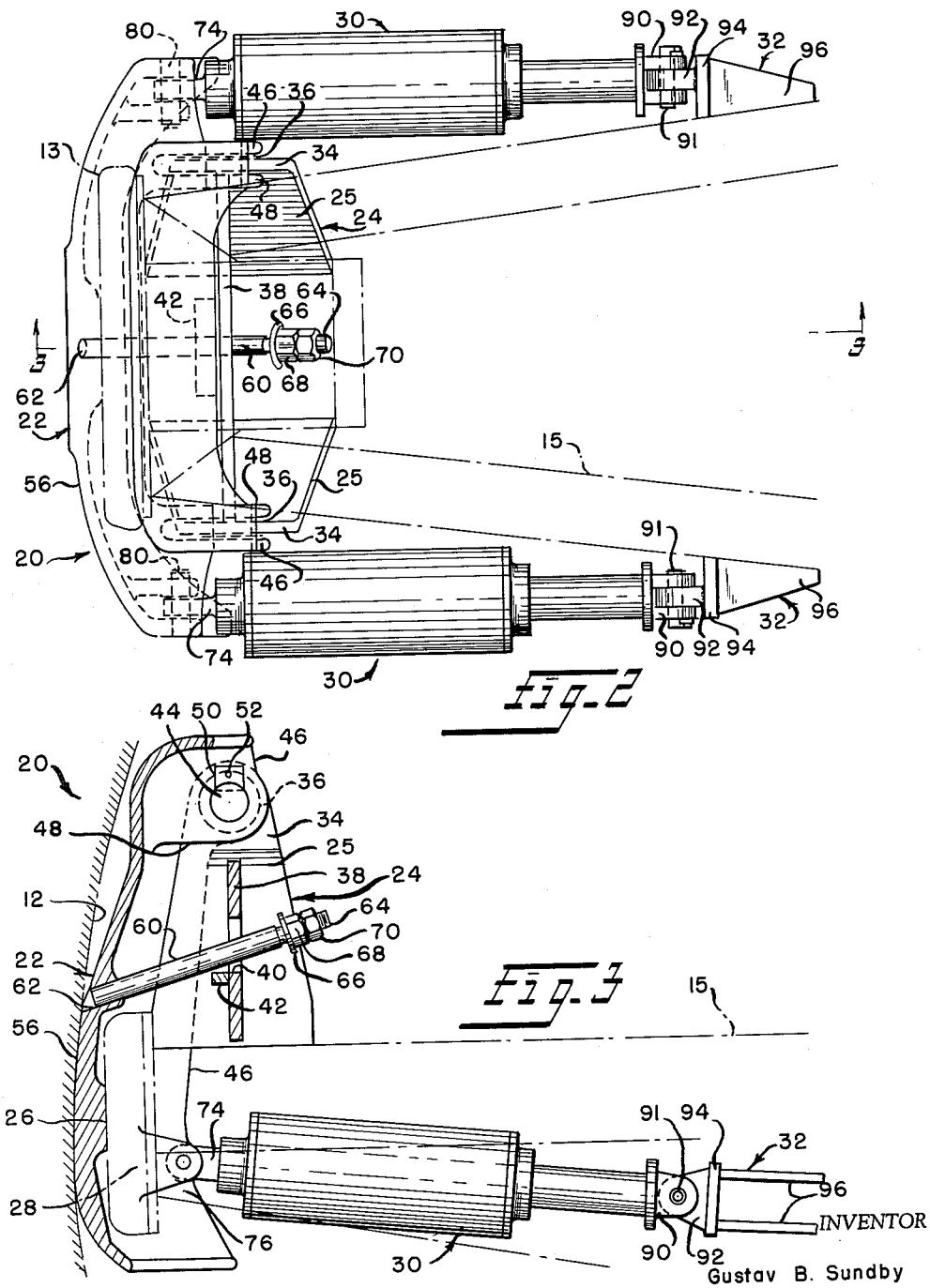

INVENTOR
Gustav B. Sundby

BY Strauch Nolan & Neale
ATTORNEYS

United States Patent Office 3,260,536
Patented July 12, 1966

3,260,536
PUSHER MECHANISM FOR VEHICLES
Gustav B. Sundby, Atchison, Kans., assignor to Rockwell Manufacturing Company, Pittsburgh, Pa., a corporation of Pennsylvania
Filed Oct. 1, 1963, Ser. No. 312,996
7 Claims. (Cl. 280—481)

This invention relates to impact pusher mechanisms for use between heavy, off-road, earth-moving vehicles designed to cushion the collision-like shocks occurring when stalled or nearly-stalled vehicles are accelerated by impact pushing forces delivered by moving pusher vehicles. More specifically, this invention relates to hydraulic impact pusher mechanisms adapted for use on earth-moving vehicles, particularly scrapers, but it is not limited to such use.

Mechanisms to cushion impact pushing loads between earth-moving vehicles by hydraulic dissipation of a portion of the impact pushing force energy have heretofore been mounted in some manner upon the pushing vehicle or tractor. As the tractor is customarily a bulldozer-type vehicle, and as the pusher mechanisms heretofore employed have been in the form of removable attachments mounted in front of, or in place of, the bulldozer blade, the bulldozer cannot be used in its normal capacity as an earth-moving piece of equipment or for general cleanup purposes around the working area as long as the pusher attachment is mounted on it and cannot be effectively used as a pusher tractor until the attachment is mounted on it.

It is, therefore, a primary object of the present invention to provide a pusher mechanism for use between a pushed earth-moving vehicle and a pushing vehicle at the rear of a conventional earth-moving push-receiving vehicle, such as a scraper, comprising a heavy spherically contoured push plate pivoted upon upstanding mounting brackets secured to the conventionally provided rear push-block support frame of the pushed vehicle in a normal or extended position spaced rearwardly away from the conventional push-block and hydraulic dissipating devices or cylinder assemblies connected between the push plate and brackets mounted on the pushed vehicle's support frame to resist the arcuate movement of the push plate from its normal position to its position abutting the push-block during the application of pushing forces through piston means providing progressively increasing resistance to said arcuate plate movement while applying the pushing force in progressively increasing magnitude to the pushed vehicle until the full force is directly applied upon contact of the push plate with the conventional push-block.

Coil springs are coaxially disposed around the piston rod between the pistons to bias the cylinder assemblies and the push plate through a recovery stroke to their respective normal positions after disengagement of the pushing and pushed vehicles.

Other objects of the present invention include:
(1) The provision of improved, simplified hydraulic cylinder assemblies to cushion impact pushing forces between earth-moving vehicles by controlled dissipation of a portion of the impact energy;
(2) In conjunction with the preceding object, the provision in these hydraulic cylinder assemblies of a piston rod which extends through axially spaced bearings supported by the cylinder;
(3) The provision of improved inter-vehicle-cushioning hydraulic cylinder assemblies wherein fluid bleeds between a piston and a cylinder wall and between the piston and piston rod to more effectively dissipate heat generated in the assembly; and
(4) The provision of improved impact shock absorbers having a plurality of fluid metering pistons relatively slidably mounted on a piston rod within a cylinder to effect a smooth progressively increasing resistance to relative movement of the piston rod in the cylinder.

These and other objects of the present invention will more fully appear from the following description and appended claims when read in conjunction with the accompanying drawings wherein:

FIGURE 1 is a fragmentary view of a pushing tractor and a scraper having a pusher mechanism according to the present invention mounted thereon;

FIGURE 2 is a top view of the pusher mechanism of FIGURE 1 mounted on the scraper push frame which is here shown in dot-dash lines;

FIGURE 3 is a longitudinal vertical section taken substantially on line 3—3 of FIGURE 2;

FIGURE 5 is a broken longitudinal vertical section through a hydraulic cylinder assembly of the pusher mechanism of FIGURE 1.

Figure 4:
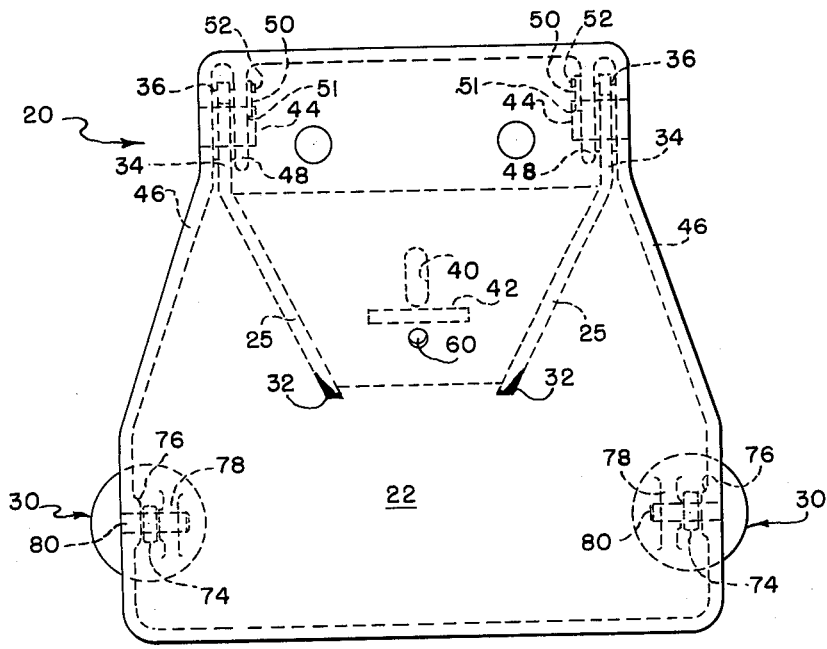
FIGURE 4 is a rear view of the pusher mechanism of FIGURE 1.

Considering the drawings in detail, FIGURE 1 shows a tractor 10 having a bulldozer blade 12 pushing a scraper 14 by its push-block support frame 15 during an earth loading operation. Although not so shown in FIGURE 1, body portion 16 of scraper 14 would be lowered into contact with ground 18 during loading. In order to cushion the initial impact of tractor 10 upon scraper 14, a pusher mechanism 20 according to the present invention is mounted on push-block support frame 15 of the scraper.

As shown in FIGURES 2 to 4, pusher mechanism 20 generally includes a contoured push plate 22 which may preferably be cast steel. Push plate 22 is pivotally mounted at an upper portion thereof on bracket assembly 24 which is mounted on push-block support frame 15 of the scraper. Push plate 22 can pivot from a normal position (not shown) toward the scraper to the position shown in FIGURE 3 in which a pad 26 on the inside concave surface of the plate contacts a push block 28 conventionally mounted at the rear of support frame 15. Two hydraulic cylinder assemblies 30 are pivotally connected at the lower opposite sides of push plate 22 and extend forwardly to a pivotal connection with suitable cylinder mounting bracket 32 fixed to scraper push frame 15.

Considered in greater detail, push plate bracket assembly 24 includes two plate-like brackets 25 secured as by welds 32 to the upper rear portion of push frame 15 adjacently in front of push block 28. Brackets 25 slope upwardly and outwardly to terminate in vertically disposed tabs 34 having transversely bored bushings 36 therein. A vertical gusset plate 38 is transversely disposed between the sloped portions of brackets 25 and is secured thereto as by welding to rigidify the bracket assembly. Gusset plate 38 is provided with a centrally located vertically elongated slot 40 and a horizontal transverse brace bar 42 welded to the rear of the gusset plate at the bottom of slot 40.

Push plate 22 is pivotally mounted in bushings 36 of brackets 25 by horizontal transverse pivot pins 44 which extend through bushings 36 and through suitable bores provided in push plate 22 through forwardly extending push plate side flanges 46 and integral push plate lugs 48 formed parallel to and inside of flanges 46. Pins 44 are retained in operative position by keys 50 which fit in suitable transverse keyways 51 in pins 44 and which are retained in position by screws 52 threaded into lugs 48 of the push plate.

Push plate 22 has a generally vertically disposed convex impact receiving portion 56 which is curved both horizontally and vertically as shown in FIGURES 2 and 3, respectively. This curved or substantially spherical configuration of push plate 22 provides for effective transmission of pushing forces despite vertical or horizontal angular misalignment between the longitudinal axes of the tractor and scraper.

Push plate 22 has a stop bolt 60 secured as by welding in a bossed bore 62 in curved portion 56 of the push plate. Stop bolt 60 extends forwardly through slot 40 in gusset plate 38 and terminates in a threaded portion 64 which carries a stop washer 66 welded upon a positioning nut 68 and secured in position by lock nut 70. When push plate 22 is in its normal rearward position spaced away from push block 28, stop washer 66 abuts gusset plate 38 near the bottom of slot 40 opposite brace bar 42. Stop bolt 60 is in a substantially horizontal orientation in the normal position of the pusher mechanism.

Cylinder assemblies 30 each terminate at a rear end in a piston rod lug 74 which extends between a boss 76 (FIGURE 4) located at the lower portion of each push plate side flange 46 and a lug 78 parallel to, but spaced inside of, boss 76. Piston rod lugs 74 are pivotally secured to side flanges 46 and lugs 78 by pins 80 extending through suitable bores provided through flange bosses 76, piston rod lugs 74, and push plate lugs 78. Pins 80 are retained in position by screw fastened keys (not shown) similar to those described above for pivot pins 44.

Hydraulic cylinder assemblies 30 each terminate at a forward end in a clevis 90. A clevis pin 91 extends through suitable transverse bores in clevis 90 and in a lug 92 of each cylinder mounting bracket 32. Lugs 92 are secured as by welding to transverse bracket plates 94 which are supported by generally triangularly shaped gussets 96 to withstand the pushing loads transmitted through the hydraulic cylinder assemblies.

As shown in FIGURE 5, each cylinder assembly 30 includes a heavy-walled cylinder 100 securely connected as by a weld 102 to a front cylinder head 104. A thrust transmitting dust cover assembly 105 includes a cylindrical dust cover 106 secured to a dust cover mounting ring 108 as by welding; the ring is secured to front cylinder head 104 by a plurality of machine screws 110. At its forward end, dust cover 106 is welded to a clevis plate 112 connected to the above described cylinder clevis 90. A safety chain 114 may be connected to clevis plate 112 by a screw 116 to prevent the front end of cylinder assembly 30 from falling to the ground in case of failure of clevis 90, cylinder mounting bracket 32, or pin 91.

A rear cylinder head 120 is secured to the rear end of cylinder 100 by a plurality of screws 122, one of which may also mount a further safety chain 124 provided at the rear end of the cylinder for the same purpose as described above for chain 114. A piston rod 126 terminating in the above described rearwardly disposed piston rod lug 74 extends through a cylindrical extension 128 of rear cylinder head 120. A piston rod wiper assembly 130 is mounted at the rear end of extension 128. Piston rod 126 is supported in rear cylinder head 120 by an annular guide bushing 132 which is mounted between a retaining ring 134 and a chevron seal assembly 136 which is provided to prevent escape of hydraulic fluid from the cylinder. Chevron seal assembly 136 is retained in position against bushing 132 by a further retaining ring 138.

Piston rod 126 extends through cylinder 100 and is supported in front cylinder head 104 by a guide bushing 140 mounted between a retaining ring 142 and a chevron seal assembly 144. Chevron seal assembly 144 is retained in position against guide bushing 140 by abutment against the rear end of dust cover mounting ring 108. Piston rod 126 is shown in FIGURE 5 in substantially its normal position, that is, the extended condition of cylinder assembly 30. In operation of the cylinder assembly, the front end of piston rod 126 moves to the dotted line position indicated at 146 in FIGURE 5. A filtered breather assembly 148 is screwed into the side wall of dust cover 106 to vent the interior of the dust cover as the piston rod moves in and out to prevent an air lock in the dust cover assembly.

Piston rod 126 is provided with a groove 150 to mount a stop collar 152 which is formed by two semicircular halves which are retained in position in groove 150 by a circumferential coil spring 154. Stop collar 152 abutting contacts a rear piston 160 which is slidably mounted upon piston rod 126 by a guide bushing 162. Guide bushing 162 is retained in position against a shoulder 163 in piston 160 and by a retaining ring 164 mounted at the end of a cylindrical piston extension 165. The piston extension supports the axially elongated bushing 162 to reduce the tendency for the pistons to cant in the cylinder. Piston 160 is provided with a suitable number of orifices 166 to permit a restricted flow of hydraulic fluid past the piston.

An intermediate piston 170 is mounted on piston rod 126 by an axially elongated guide bushing 172 which is retained in position by retaining rings 174 mounted in the ends of cylindrical piston extensions 176 and 177. Intermediate piston 170 has hydraulic fluid orifices 178 which have a smaller total area than orifices 166 in rear piston 160.

A front piston 180 is similarly slidably mounted on piston rod 126 by an axially elongated guide bushing 182 which is retained in position by retaining rings 184 mounted at the ends of cylindrical piston extensions 186 and 187. Front piston 180 is not provided with any through orifices but depends upon clearance with cylinder 100 and with piston rod 126 for bleed passages for hydraulic fluid thereby. Compression coil springs 190, 192, and 194 are located around piston rod 126 between the front cylinder head 104, front piston 180, intermediate piston 170, and rear piston 160, respectively, to bias the assembly to its extended condition. Cylinder assembly 30 is also provided with plugged filling orifices 198, 200 and 202 through the wall of cylinder 100 opening into the spaces between the normal positions of the pistons shown in FIGURE 5.

In operation, the pusher mechanism 20 of the present invention is mounted as described above upon the rear push frame 15 of a scraper. The coil springs within the cylinder assembly 30 are effective to normally separate the pistons and to urge the rear piston 160 and its associated stop collar 152 toward the rear cylinder head 120. This extension of the cylinder assemblies returns push plate 22 away from push block 28 to a normal or extended position as determined by the setting of stop bolt washer 66 which engages gusset plate 38. Stop washer 66 is adjusted to prevent destructive abutting contact in the normal condition between components within the hydraulic cylinder assemblies, namely between stop collar 152 and rear cylinder head 120.

As scraper 14 commences an earth loading pass and begins to slow down under the drag of the scraper blade through the earth, a tractor 10 may be quickly steered to a position behind scraper 14 and without slowing down may contact pusher mechanism 20 with a collision-like impact. Because of the substantially spherically contoured configuration of push plate 22, effective pushing engagement can be accomplished between the vehicles even though there is an angular misalignment, either horizontal or vertical, between the longitudinal axes of the vehicles.

Upon initial impact, push plate 22 pivots about pins 44 so that the lower portion thereof moves forwardly thus urging piston rods 126 into cylinders 100. The stop collar 152 on each piston rod urges its associated rear piston 160 through cylinder 100, which motion is resisted by the passage of hydraulic fluid from the front to the rear of the piston through metering orifices 166. Except for the interposition of return biasing spring 194 between rear piston 160 and intermediate piston 170, this motion of piston 160 would continue until it contacted piston 170. Then, both pistons 160 and 170 would move forward together through cylinder 100 with an increased hydraulic resistance since the fluid is now being metered successively through two sets of orifices (178 and 166) and since total orifice area in piston 170 is less than that in piston 160.

Again, except for interposition of biasing return spring 192, pistons 160 and 170 would continue moving forward until intermediate piston 170 contacted front piston 180. Then a further increase in resistance to piston rod movement would occur particularly since fluid passage past front piston 180 is limited to the bleed of hydraulic fluid through the clearance spaces between the piston and cylinder 100 and between piston bushing 182 and piston rod 126. Finally, as front piston 180 nears cylindrical portion 105 of the front cylinder head 104, but before abutment therewith, pad 26 on the interior surface of push plate 22 contacts push block 28 of the scarper. Thereafter, tractor pushing froces are transmitted directly through the push plate to the push block without further cushioning action by the pusher mechanism 22.

However, coil biasing springs 192 and 194 are interposed between the pistons and modify the above described action slightly. Although these springs are relatively light duty in comparison to the heavy pushing loads applied by a tractor, and although they are primarily for purpose of biasing the mechanism to its normal or recovered position, the springs are effective upon the power transmission or collapsing stroke of the cylinder assembly to initiate movement of the intermediate piston and the front piston prior to the time of actual abutment by the piston adjacently to the rear thereof. This action has the desirable effect of smoothing the overall operation of the cylinder assembly to achieve a smoothly gradually increasing resistance to collapsing movement of the piston assembly to transmit a smoothly increasing push force to the scraper.

During operation, the cylindrical piston extensions 165, 176, 177, 186 and 187 serve not only to support the elongated piston bushings to prevent piston canting but also serve to prevent face-to-face contact between pistons, which contact would block off the piston flow orifices. Further, the extensions serve to provide a predetermined maximum axial compression of the coil springs to prevent overstress or solid stacking of the coils.

Upon completion of the earth-loading operation, which may take about one to three minutes, the scraper blade (not shown) is raised and the scraper begins to accelerate while the tractor may be maneuvered to a piston behind a further scraper to assist it in loading. Upon separation of the scraper 14 and the tractor, biasing springs 190, 192, and 194 effect a gradual return of the pusher mechanism 20 to its normal position preparatory to another impact pushing engagement during a subsequent loading operation. Inasmuch as a relatively long period of time transpires prior to this subsequent loading operation, the hydraulic cylinder assemblies need not be provided with any complicated check valve arrangement to provide for a more rapid recovery than is attained by the use of the relatively light biasing springs which force hydraulic fluid in the opposite direction through the same orifices that were used on the power stroke of the cylinder assemblies to smooth the transmission of the impact pushing force to the scraper.

In the recovery or the extension stroke of the cylinder assembly, coil springs 192 and 194 attain a fully expanded condition before coil spring 190 because of the higher resistance to fluid flow around front piston 180. Therefore, initial recovery of the piston assembly is accomplished relatively rapidly while final recovery is relatively slow. This prevents an undesirable banging of the various parts at the end of the recovery stroke, especially stop washer 66 against gusset plate 38.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In an earth-moving vehicle having a push block and a support frame therefor, an impact pusher mechanism comprising;
   (a) a push member for receiving impact and pushing forces from an auxiliary pushing vehicle;
   (b) means mounting said push member relative to said push block for motion between a normal position spaced from said push block to a position in abutting contact with said push block; and
   (c) hydraulic means positioned between said push member and said support frame, including a series of hydraulic pistons housed in cylinder means and formed and arranged in sequential spaced relation to provide progressively increasing resistance to movement of said push member to its abutting contact position whereby the initial impact forces are smoothly transmitted in progressively increased magnitude as pushing forces from said auxiliary pushing vehicle to said earth-moving vehicle by variably dissipating a portion of the pushing energy while said push member moves forwardly into abutting contact with said push block, said push member thereafter transmitting the pushing force directly to said push block to thereby relieve said hydraulic means of the relatively high, prolonged pushing forces between vehicles.

2. A mechanism as defined in claim 1 wherein said pistons are formed to permit progressively decreasing fluid flow from one side to the other side upon movement of successive pistons in said cylinder.

3. A mechanism as defined in claim 2 wherein the piston adjacent said one cylinder end is devoid of orifices and depends solely on clearances with said piston rod and with said cylinder for fluid passage thereby.

4. A mechanism as defined in claim 1 wherein said cylinder means is a single cylinder and a piston rod slidingly supported at one cylinder end and at a point within said cylinder remote from said one cylinde end is provided to slidingly support said pistons.

5. A mechanism as defined in claim 4 wherein each of said pistons has axially extending cylindrical extensions radially spaced around said piston rod to house axially elongated bearing elements to slidingly support said pistons against canting thereof in said cylinder.

6. A mechanism as defined in claim 4 wherein said piston rod extends through said one cylinder end and a pushing-force-transmitting dust cover is connected to said one cylinder end to protect said piston rod when it passes beyond said one cylinder end and is adapted to transmit the pushing forces applied through said hydraulic means.

7. A mechanism as defined in claim 6 wherein said piston rod and said cylinder are sealed at said cylinder ends against fluid flow and said dust cover is provided with a filtered breather port to prevent an air lock in operation.

(References on following page)

References Cited by the Examiner

UNITED STATES PATENTS

| | | | |
|---|---|---|---|
| 1,529,668 | 3/1921 | Perlman | 293—44 |
| 1,605,798 | 11/1926 | Van Crombrugge | 188—88.501 |
| 2,461,066 | 2/1949 | Kent | 267—34 |
| 2,500,970 | 3/1950 | Walker | 180—9.1 |
| 2,638,339 | 5/1953 | Taylor | 267—34 X |
| 2,986,827 | 6/1961 | Peterson | 280—481 X |
| 2,999,697 | 9/1961 | Winget | 280—481 |
| 3,139,290 | 6/1965 | Swick | 280—481 |

LEO FRIAGLIA, *Primary Examiner.*

BENJAMIN HERSH, *Examiner.*

R. C. PODWIL, *Assistant Examiner.*